United States Patent
Gerhard (10) Patent No.: US 9,430,401 B2
(45) Date of Patent: *Aug. 30, 2016

(54) IMPLEMENTING PAGING OPTIMIZATION TO AVOID POPULATE ON PAGE FAULT DURING AN IO READ

(71) Applicant: International Business Machines Corporation, Armonk, NY (US)

(72) Inventor: Adrian C. Gerhard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 69 days.

This patent is subject to a terminal disclaimer.

(21) Appl. No.: 14/598,617

(22) Filed: Jan. 16, 2015

(65) Prior Publication Data

US 2016/0210244 A1    Jul. 21, 2016

(51) Int. Cl.
*G06F 12/1009* (2016.01)
*G06F 12/12* (2016.01)
*G06F 12/10* (2016.01)

(52) U.S. Cl.
CPC .......... *G06F 12/12* (2013.01); *G06F 12/1009* (2013.01); *G06F 12/126* (2013.01); *G06F 2212/403* (2013.01); *G06F 2212/69* (2013.01)

(58) Field of Classification Search
CPC .. G06F 12/12; G06F 12/126; G06F 2212/69; G06F 2212/206
See application file for complete search history.

(56) References Cited

U.S. PATENT DOCUMENTS

| | | | | |
|---|---|---|---|---|
| 5,159,678 A * | 10/1992 | Wengelski | ................. | G06F 8/41 711/153 |
| 5,247,687 A * | 9/1993 | Eilert | ..................... | G06F 12/121 711/153 |
| 5,404,478 A * | 4/1995 | Arai | ......................... | G06F 12/08 711/206 |
| 6,792,521 B2 | 9/2004 | Arimilli et al. | | |
| 7,562,204 B1 * | 7/2009 | Cholleti | ................. | G06F 12/109 711/163 |
| 7,653,797 B1 * | 1/2010 | Phillips | ................ | G06F 12/0261 711/133 |
| 7,680,987 B1 * | 3/2010 | Clark | ....................... | G06F 12/08 711/147 |
| 8,352,705 B2 * | 1/2013 | Agesen | ................ | G06F 12/1009 711/206 |
| 8,438,363 B1 * | 5/2013 | Koryakin | ............. | G06F 12/1036 711/207 |
| 2002/0133675 A1 * | 9/2002 | Hirayama | .............. | G06F 3/0619 711/150 |
| 2005/0021916 A1 * | 1/2005 | Loafman | .................. | G06F 12/08 711/154 |
| 2007/0118712 A1 * | 5/2007 | van Riel | ................ | G06F 12/023 711/170 |

(Continued)

FOREIGN PATENT DOCUMENTS

CN        103761051 A    4/2014

OTHER PUBLICATIONS

Appendix P—List of IBM Patents or Patent Applications Treated as Related—May 6, 2015.

*Primary Examiner* — Jared Rutz
*Assistant Examiner* — Khoa D Doan
(74) *Attorney, Agent, or Firm* — Joan Pennington (57) ABSTRACT

A method and system for implementing paging optimization to avoid populate on page fault during an Input Output (IO) read. A size of the IO read is evaluated. If the IO does not entirely cover a page, then the page is paged in. If the IO entirely covers one or more pages, those pages are not paged in. Page attributes may be different during the IO read. Pages that are paged in are marked readable and writable but pages that are waiting for the IO to populate them are only marked writeable. Once the IO read has completed, the pages are marked readable and writable and all outstanding faults due to reads during this window are completed.

7 Claims, 10 Drawing Sheets

(56) References Cited

U.S. PATENT DOCUMENTS

| | | | |
|---|---|---|---|
| 2010/0321397 A1* | 12/2010 | Ginzburg | G06F 12/12 345/531 |
| 2011/0173155 A1* | 7/2011 | Becchi | G06F 9/5044 707/610 |
| 2012/0079175 A1* | 3/2012 | Flynn | G11C 7/1012 711/103 |
| 2012/0265910 A1* | 10/2012 | Galles | G06F 13/4022 710/300 |
| 2013/0042080 A1* | 2/2013 | Waddington | G06F 9/526 711/152 |
| 2013/0073823 A1* | 3/2013 | Hunter | G06F 9/45533 711/162 |
| 2013/0166834 A1* | 6/2013 | Mayhew | G06F 12/10 711/105 |
| 2014/0089528 A1* | 3/2014 | Bloch | G06F 12/08 710/4 |
| 2014/0351520 A1* | 11/2014 | Moharil | G06F 12/0871 711/122 |

* cited by examiner

IMPLEMENTING PAGING OPTIMIZATION TO AVOID POPULATE ON PAGE FAULT DURING AN IO READ

FIELD OF THE INVENTION

The present invention relates generally to the data processing field, and more particularly, relates to a method and system for implementing paging optimization to avoid populate on page fault during an Input Output (IO) read.

DESCRIPTION OF THE RELATED ART

Figure 2A:
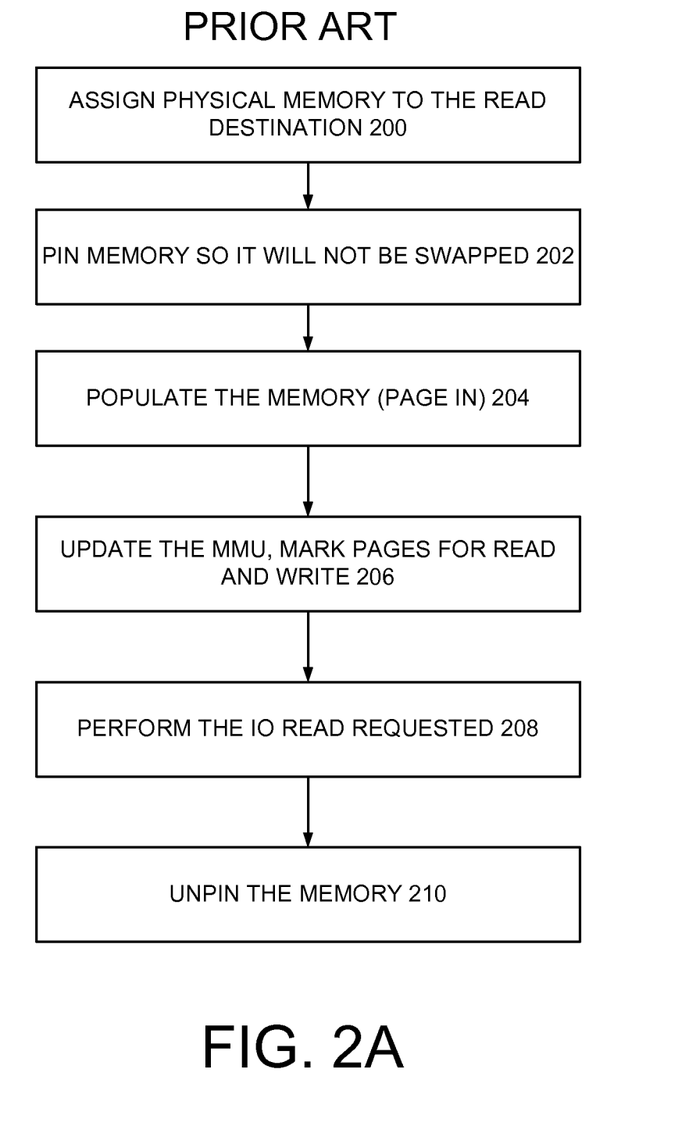
Figure 2B:
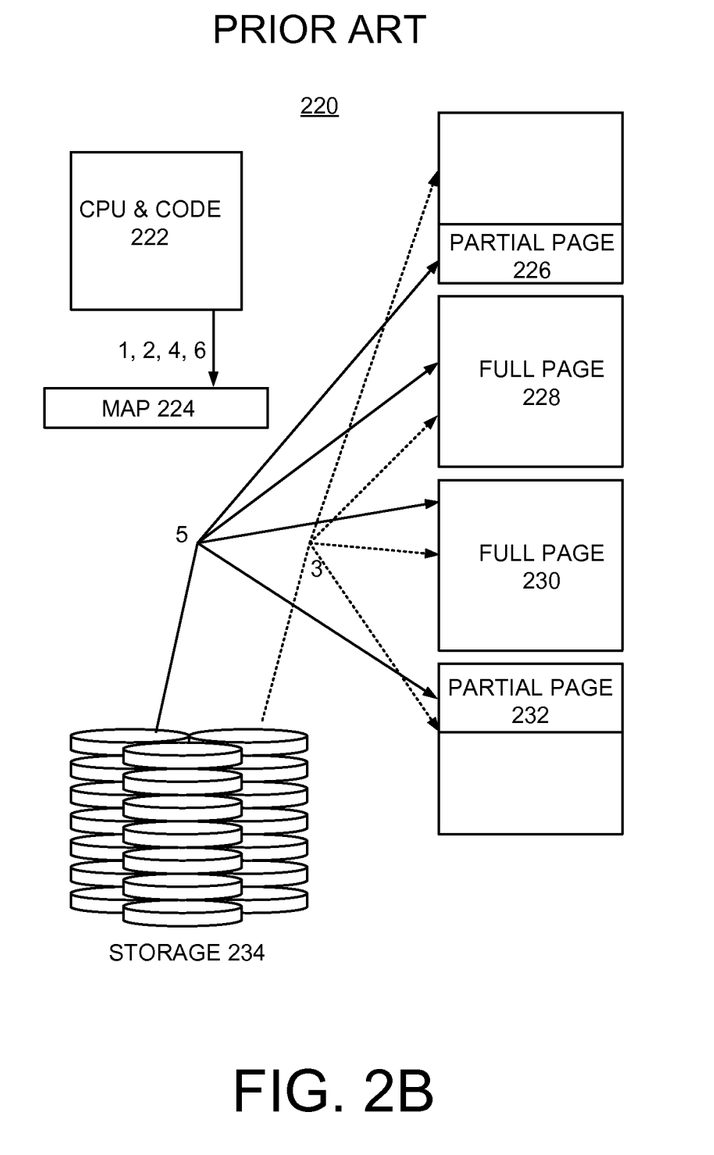
Figure 2C:
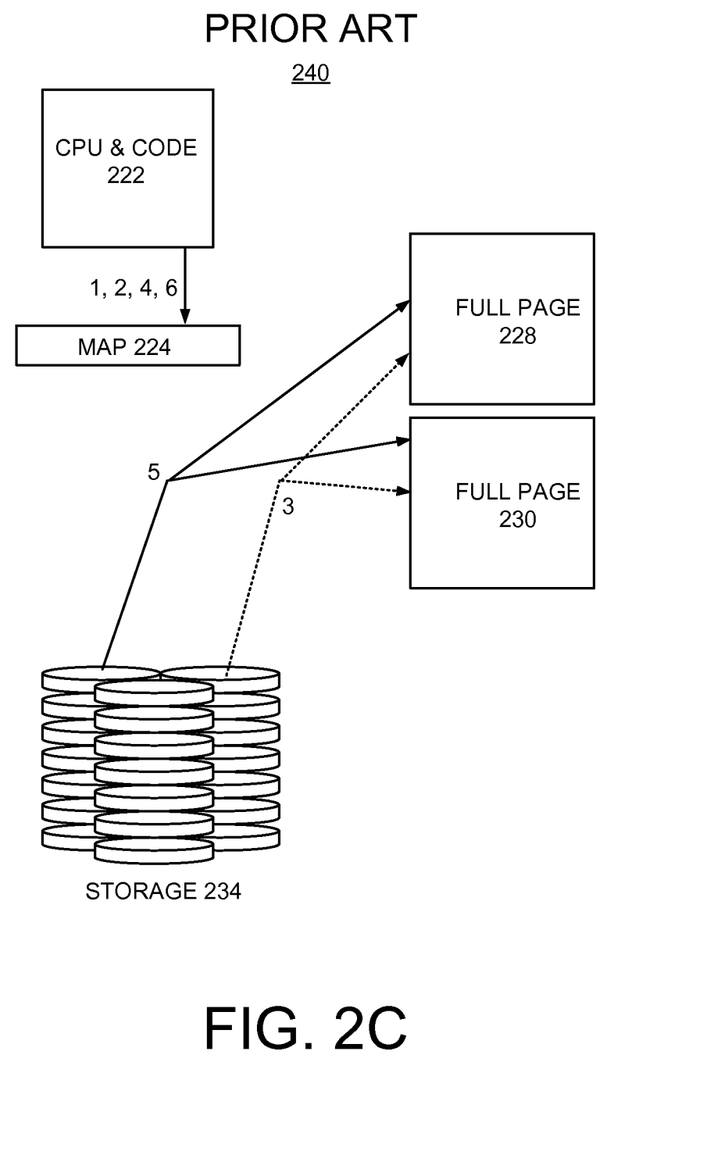

FIGS. 2A-2C together illustrate a prior art normal read flow with page populate. When a page fault is taken attempting to read or write a location in virtual memory that has been paged out, the paging system must first find free real memory to map to that virtual address, then it must read data, potentially from disk, back into memory before calling the fault complete and resuming running.

To perform an IO read, potentially from a storage subsystem, the destination memory must first be pinned, or set such that the real memory is available and will not be paged out while the IO operation is in progress. If the destination has been paged out, it must first be paged in, then marked such that it will not be paged out, and then the IO may begin.

As part of the IO read operation, the memory region or a portion of the memory region will be overwritten with the data from the IO. Potentially, this region to be overwritten had just been paged in simply to be pinned in memory. Paging this memory in, only to have it overwritten adds unnecessary latency and IO to the operation.

A need exists for an effective mechanism to enable enhanced paging optimization to avoid populate on page fault during an IO read.

SUMMARY OF THE INVENTION

Principal aspects of the present invention are to provide a method and system for implementing paging optimization to avoid populate on page fault during an Input Output (IO) read. Other important aspects of the present invention are to provide such method, system and memory controller and DRAM configuration which can, under certain conditions, double the number of accesses, substantially without negative effects and that overcome some of the disadvantages of prior art arrangements.

In brief, a method and system for implementing paging optimization to avoid populate on page fault during an Input Output (IO) read. A size of the IO read is evaluated. If the IO does not entirely cover a page, then the page is paged in. If the IO entirely covers one or more pages, those pages are not paged in. Page attributes may be different during the IO read. Pages that are paged in are marked readable and writable but pages that are waiting for the IO to populate them are only marked writeable. Once the IO read has completed, the pages are marked readable and writable and all outstanding faults due to reads during this window are completed.

In accordance with features of the invention, during the time of the IO read, while a page is marked as non-readable, if a read page fault occurs, the fault handler waits for the IO read to complete prior to returning from the fault.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system for implementing paging optimization to avoid populate on page fault during an Input Output (IO) read. The system implements paging optimization to avoid populating the memory and having to overwrite it again as part of an IO read, the size of the IO read is determined. If it is determined not to cover an entire page, then the page is paged in. But, if it covers an entire page, or multiple pages, then the entirely covered pages do not need to be paged in. Page attributes also have to be considered since they can be different during an IO read; paged in pages can be marked as readable and writeable, and those that are not and are still waiting to be populated during an IO read, can be marked writeable. If a page is marked as non-readable, but then a page fault occurs, the fault handler must wait for the IO read to complete before it returns from the fault.

Figure 1A:
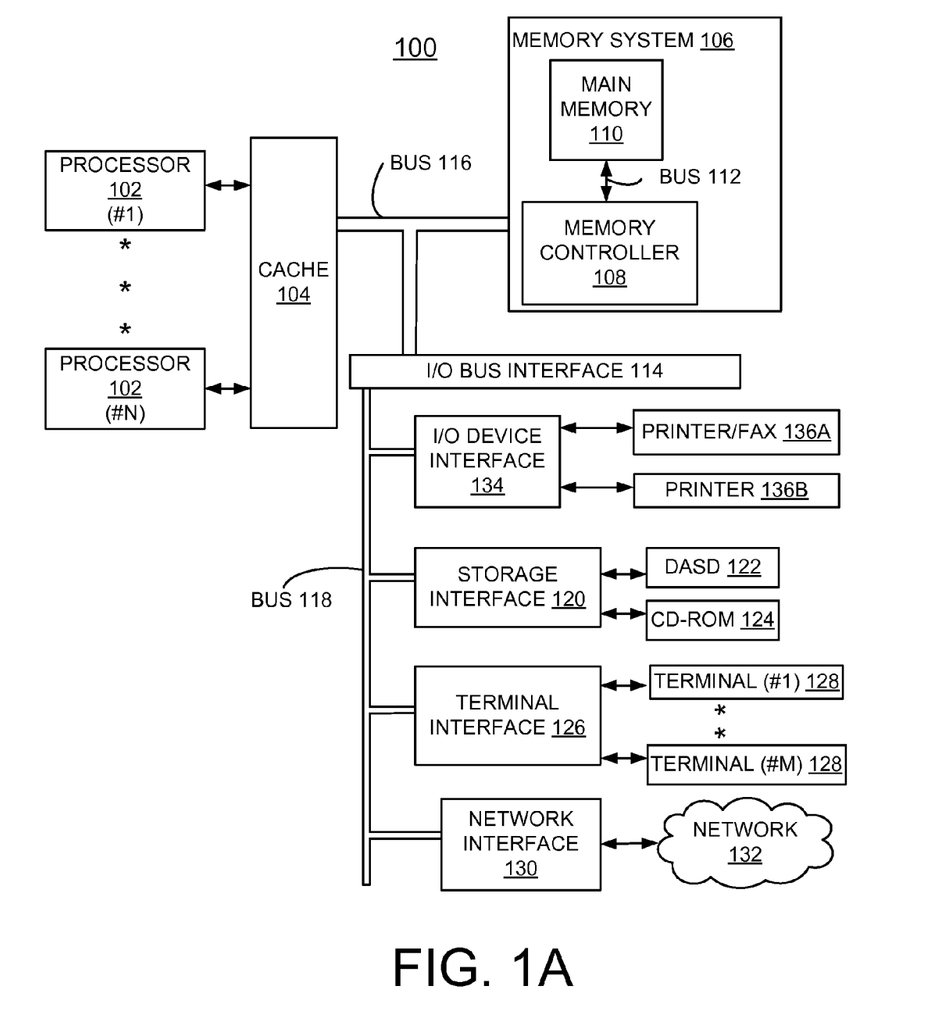
FIG. 1A illustrates an example computer system for implementing paging optimization to avoid populate on page fault during an Input Output (IO) read in accordance with preferred embodiments.

Having reference now to the drawings, in FIG. 1A, there is shown an example computer system generally designated by the reference character 100 for implementing paging optimization to avoid populate on page fault during an IO read in accordance with the preferred embodiment. Computer system 100 includes one or more processors 102 or general-purpose programmable central processing units (CPUs) 102, #1-N. As shown, computer system 100 includes multiple processors 102 typical of a relatively large system;

however, system 100 can include a single CPU 102. Computer system 100 includes a cache memory 104 connected to each processor 102.

Computer system 100 includes a memory system 106 including a memory controller 108 and a main memory 110 connected by a bus 112. Bus 112 is one or more busses that send address/command information to main memory 110 and send and receive data from the memory 110. Main memory 110 is a random-access semiconductor memory for storing data, including programs. Main memory 110 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, memory controller 108 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

Computer system 100 is shown in simplified form sufficient for understanding the present invention. The illustrated computer system 100 is not intended to imply architectural or functional limitations. Although main memory 110 of main memory system 106 is represented conceptually in FIG. 1A as a single entity, it will be understood that in fact the main memory is more complex. In particular, main memory system 106 comprises multiple modules and components. The present invention can be used with various hardware implementations and systems and various other internal hardware devices.

Figure 1B:
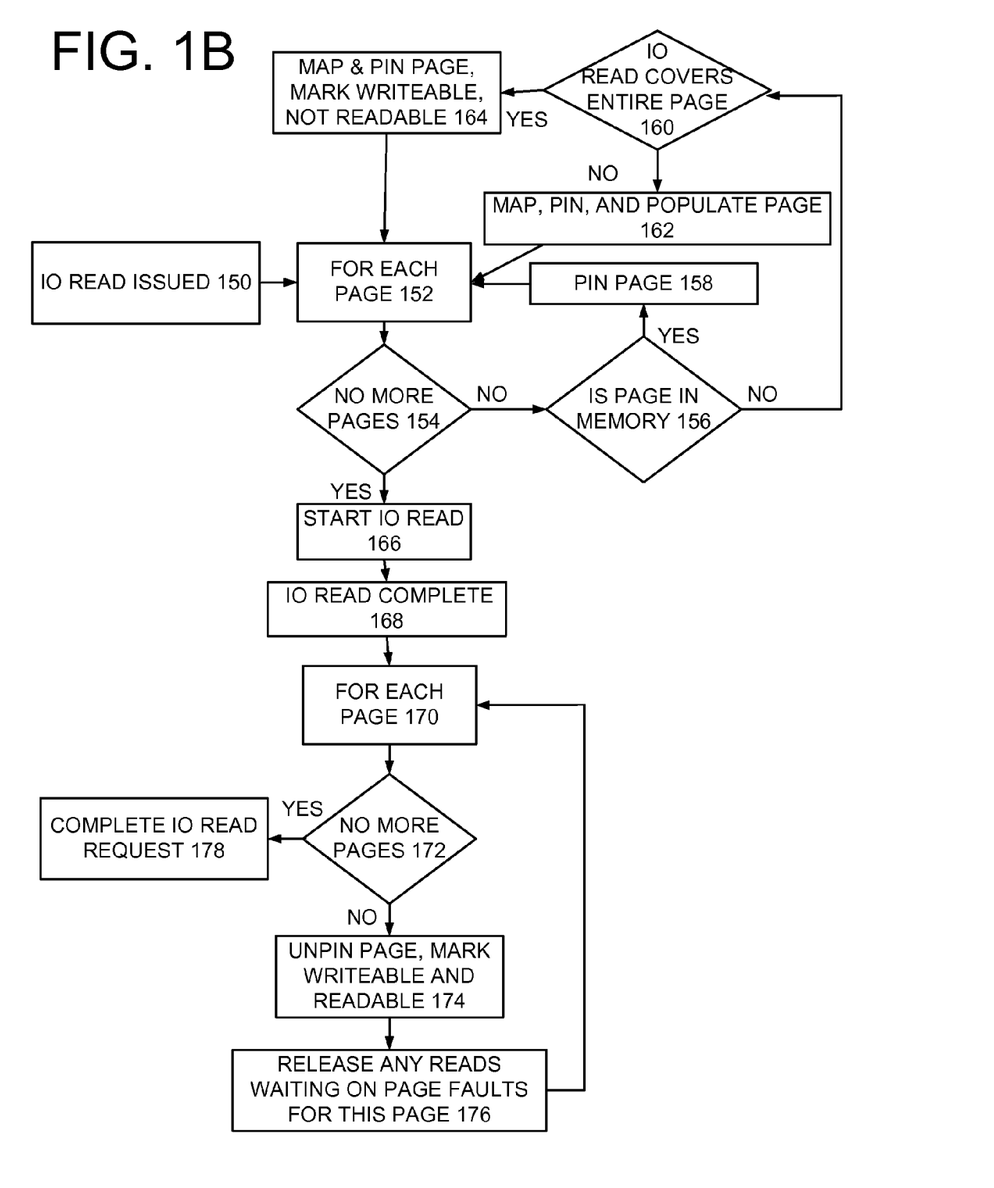
FIG. 1B illustrates example operations for implementing paging optimization to avoid populate on page fault during an Input Output (IO) read in accordance with preferred embodiments FIGS. 2A-2C together illustrate prior art normal read flow with page populate.

Referring to FIG. 1B, there are shown example operations for implementing paging optimization to avoid populate on page fault during an Input Output (IO) read in accordance with preferred embodiments. As indicated in a block 150, an IO read is issued. For each page as indicated in a block 152, until all pages are processed as indicated in a decision block 154 checking if the page is in memory is performed as indicated in a decision block 156. If this data already resides in memory, then the page is pinned as indicated in a block 158 as conventionally done. If this data does not already reside in memory, then checking if the IO read covers an entire page is performed as indicated in a decision block 160. If the IO will not cover the entire page, then the page is mapped and pinned and the data for the page is paged in as indicated in a block 162 as conventionally done. If the IO read covers an entire page, then the memory is mapped and pinned and the page is then marked writable but not readable as indicated at block 164.

In known systems, while the IO is pending, an access to this page prior to the page being populated would cause a fault. Any access would have to wait for the fault to be resolved. Once the page was populated but while the IO is pending, accesses could be made to the page without causing a fault. However, given there is an IO in the process of writing data to that page, writes to that page are in a race with the IO read data and reads may get old or new data.

In accordance with features of the invention, while the IO is pending, the page is essentially populated with garbage data. So, a read to this region would not get "old" or "new" data and thus must be blocked. Thus, a read to this page would cause a fault, just as it does prior to the page being populated prior to the present invention. A write to this region is in a race with the IO read, just as it is without the present invention, thus a write can be allowed to proceed. However, it should be noted that a write from a core which causes a cache line to populate is actually a read and can not be permitted.

After each page has been assessed at decision block 154, then the IO read is started as indicated in a block 166. The IO read is complete as indicated in a block 168. For each page as indicated in a block 170 checking until no more pages are identified is performed as indicated in a decision block 172, the page is unpinned and marked as writeable and readable as indicated in a block 174. Any reads waiting on page faults for this page are released as indicated in a block 176. When no more pages are identified at decision block 168, then the IO read request is completed as indicated in a block 178.

Figure 3A:
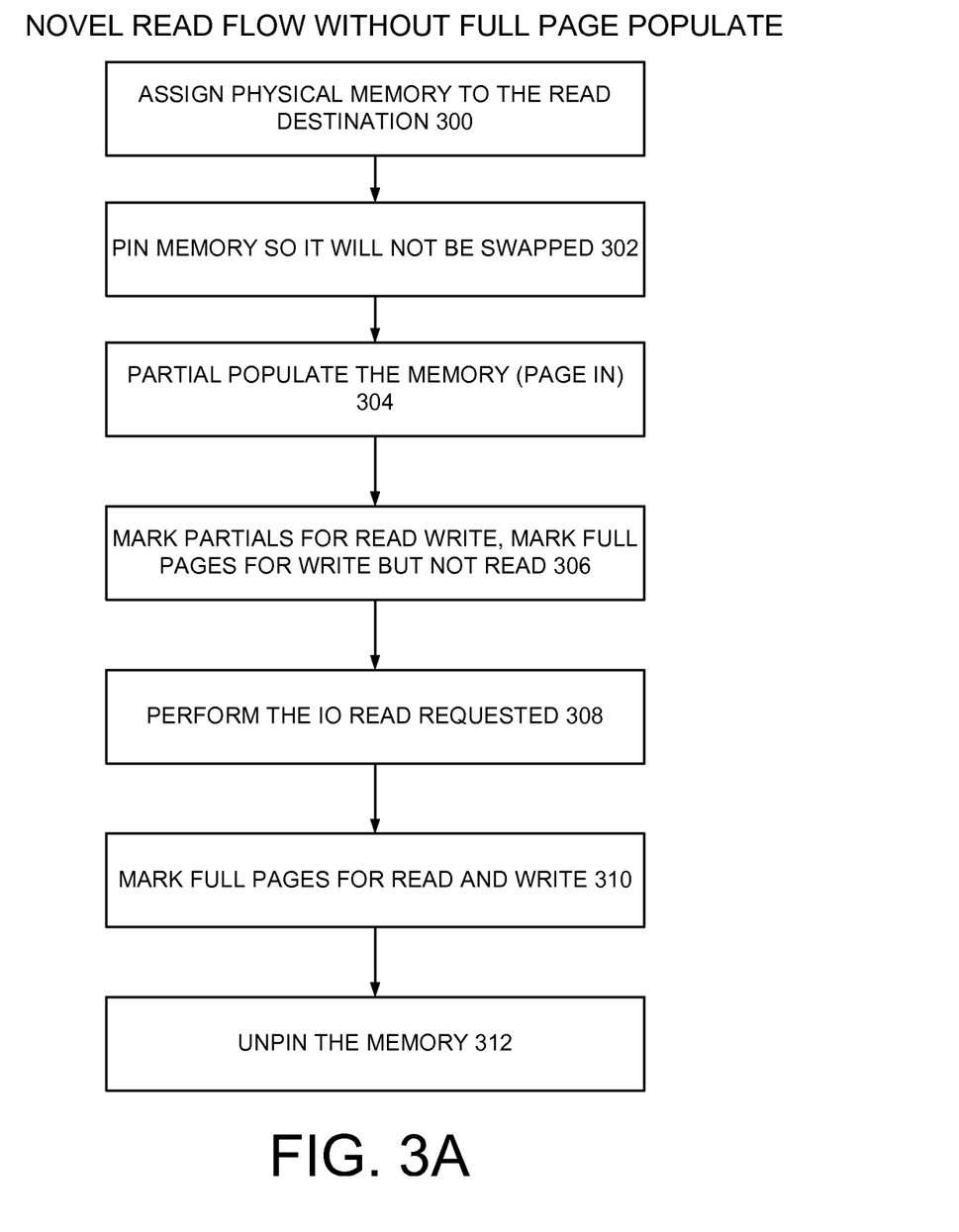
FIGS. 3A and 3B and FIGS. 4A and 4B respectively illustrate example operations for implementing paging optimization to avoid populate on page fault during an Input Output (IO) read in accordance with preferred embodiments.
Figure 3B:
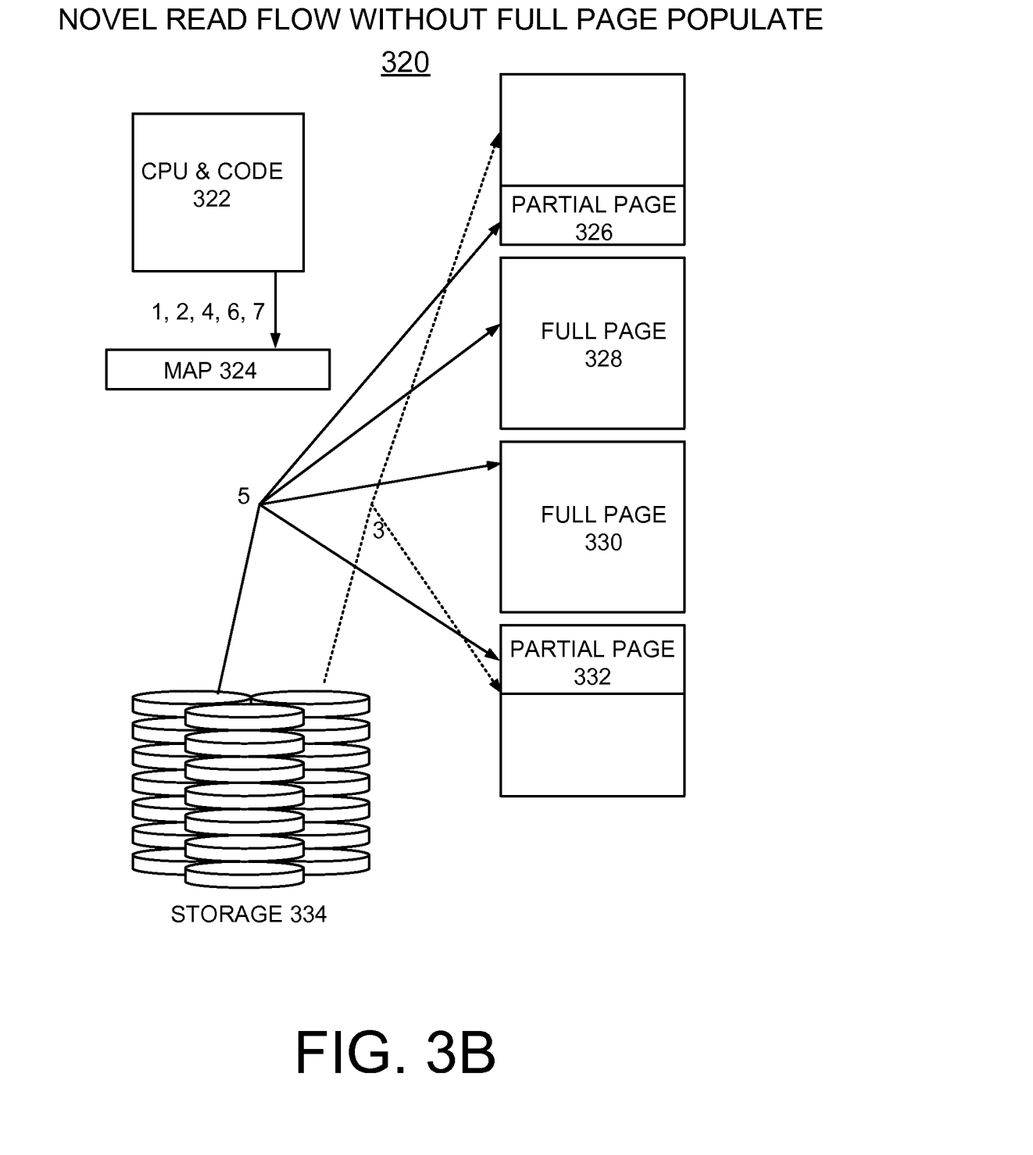

Referring to FIGS. 3A and 3B, there are shown example operations for implementing paging optimization to avoid populate on page fault during an Input Output (IO) read in accordance with preferred embodiments.

In FIGS. 3A and 3B, example novel read flow without full page populate operations are shown. In FIG. 3A, as indicated in a block 300, physical memory to the read destination is assigned, as indicated by line 1 between CPU and code 322 to map 324 in FIG. 3B. Pin the memory so it will not be swapped as indicated in a block 302, as indicated by line 2 between CPU and code 322 to map 324 in FIG. 3B. In FIG. 3A, as indicated in a block 304, for partial page, such as partial pages 326, 332 in FIG. 3B, the memory is populated or the partial page is paged in as indicated by lines 3 between storage 334 and the partial pages 326, 332 in FIG. 3B. In FIG. 3A, as indicated in a block 306, the partial pages are marked for read write, and full pages, such as pages 328, 330 in FIG. 3B, are marked for write but not read, as indicated by line 4 between CPU and code 322 to map 324. In FIG. 3A, as indicated in a block 308, the IO read requested is performed, and lines 5 between storage 334 and the partial and full pages 326, 328, 330, 332 in FIG. 3B. In FIG. 3A, as indicated in a block 310, the full pages are marked as read and write, and by line 6 between CPU and code 322 to map 324 in FIG. 3B. In FIG. 3A, as indicated in a block 312, the memory is unpinned, as indicated by line 7 between CPU and code 322 to map 324 in FIG. 3B.

Figure 4A:
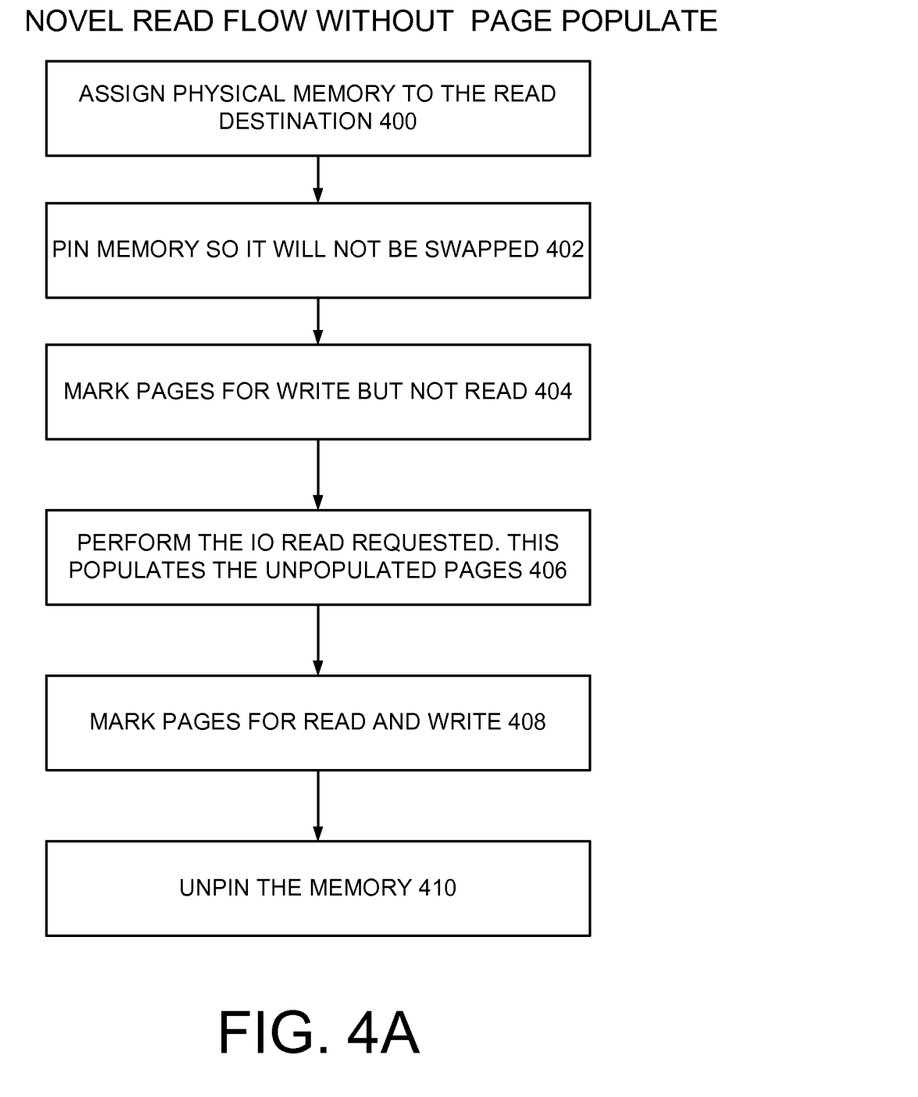
Figure 4B:
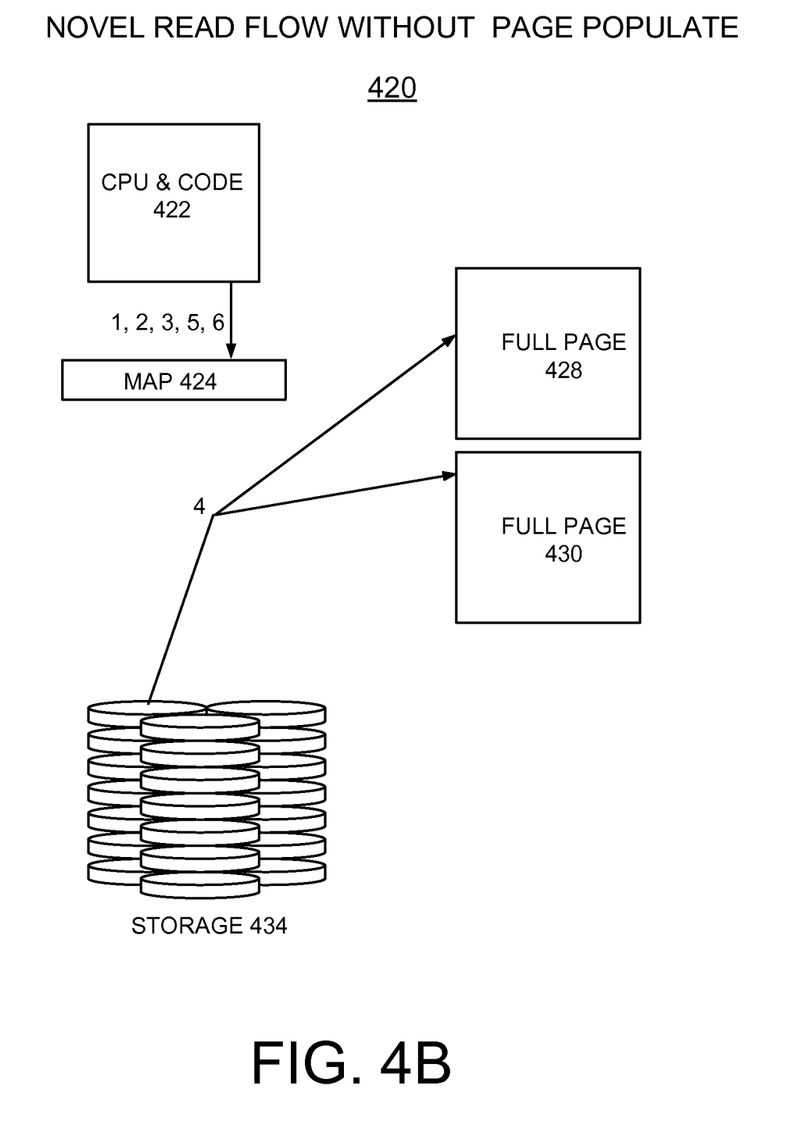

Referring to FIGS. 4A and 4B, there are shown example operations for implementing paging optimization to avoid populate on page fault during an Input Output (IO) read in accordance with preferred embodiments.

In FIGS. 4A and 4B, example novel read flow without page populate operations are shown. In FIG. 4A, as indicated in a block 400, physical memory is assigned to the read destination as indicated by line 1 between CPU and code 422 to map 424 in FIG. 4B. Pin the memory so it will not be swapped as indicated in a block 402, as indicated by line 2 between CPU and code 422 to map 424 in FIG. 4B. In FIG. 4A, as indicated in a block 404, the full pages, such as full pages 428, 430 in FIG. 4B, are marked for write but not read, as indicated by line 3 between CPU and code 422 to map 424 in FIG. 4B. In FIG. 4A, as indicated in a block 406, the IO read requested is performed, and as indicated by lines 4 between storage 434 and the full pages 428, 430 in FIG. 4B. In FIG. 4A, as indicated in a block 408, the full pages are marked as read and write, and as indicated by line 5 between CPU and code 422 to map 424 in FIG. 4B. In FIG. 4A, as indicated in a block 410, the memory is unpinned, and as indicated by line 6 between CPU and code 422 to map 424 in FIG. 4B.

Figure 5:
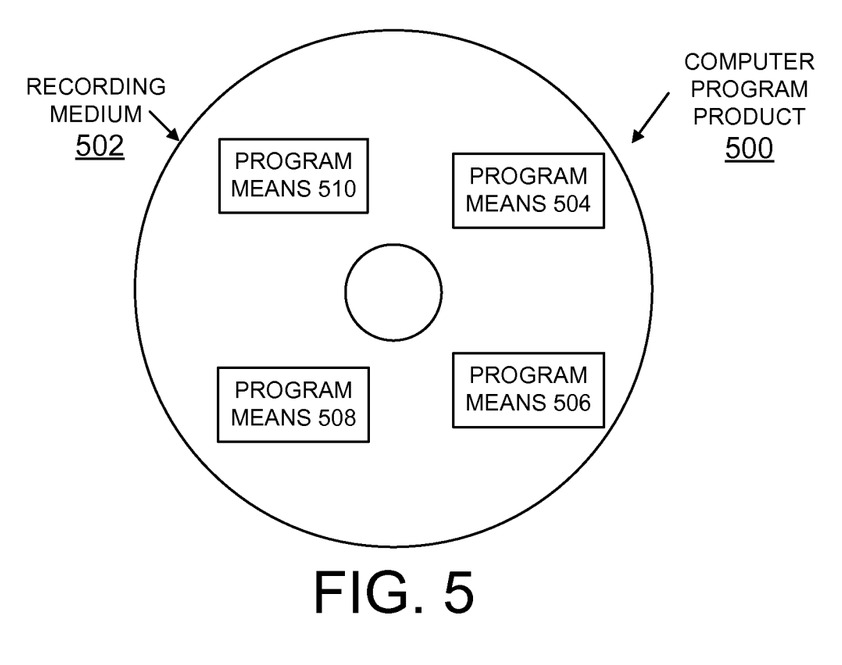
FIG. 5 is a block diagram illustrating a computer program product in accordance with the preferred embodiment.

Referring now to FIG. 5, an article of manufacture or a computer program product 500 of the invention is illustrated. The computer program product 500 is tangibly embodied on a non-transitory computer readable storage medium that includes a recording medium 502, such as, a floppy disk, a high capacity read only memory in the form of an optically read compact disk or CD-ROM, a tape, or another similar computer program product. Recording medium 502 stores program means 504, 506, 508, and 510 on the medium 502 for carrying out the methods for implementing paging optimization to avoid populate on page fault during an Input Output (IO) read.

A sequence of program instructions or a logical assembly of one or more interrelated modules defined by the recorded program means 504, 506, 508, and 510, direct the system 100 for implementing paging optimization to avoid populate on page fault during an Input Output (IO) read of the preferred embodiments.

While the present invention has been described with reference to the details of the embodiments of the invention shown in the drawing, these details are not intended to limit the scope of the invention as claimed in the appended claims.

What is claimed is:

1. A system for implementing paging optimization to avoid populate on page fault during an Input Output (IO) read comprising:
    a processor, said processor determining a size of the IO read;
    said processor, responsive to the IO entirely covering one or more full pages, and the full pages not being paged in
    evaluating the page attributes during the IO read; and
    marking the pages, that are waiting for the IO to populate these pages, only writeable;
    said processor, marking the page as readable once the IO read has completed and completing all outstanding faults due to reads.

2. The memory system as recited in claim 1, includes control code stored on a computer readable medium, and wherein said processor uses said control code to implement paging optimization to avoid populate on page fault during an Input Output (IO) read.

3. The memory system as recited in claim 1 includes said processor, assigning physical memory to the read destination for the IO read.

4. The system as recited in claim 3 includes said processor, pinning the assigned memory for avoiding memory being swapped.

5. The system as recited in claim 1 includes said processor, for a page being marked as non-readable, responsive to a read page fault occurs, waiting for the IO read to complete prior to returning from the fault.

6. The system as recited in claim 1 includes said processor, responsive to the IO not entirely covering a page, paging in the page.

7. The system as recited in claim 6 includes said processor, marking pages being paged in as readable and writeable after the pages are paged in.

* * * * *